US008170600B2

(12) United States Patent
Song et al.

(10) Patent No.: US 8,170,600 B2
(45) Date of Patent: May 1, 2012

(54) METHOD AND APPARATUS FOR ALLOCATING DOWNLINK POWER IN WIRELESS COMMUNICATION SYSTEM

(75) Inventors: Kuk-Jin Song, Yongin-si (KR); Jae-Hyeong Kim, Seoul (KR)

(73) Assignee: Seah Networks Co., Ltd., Seoul (KR)

( * ) Notice: Subject to any disclaimer, the term of this patent is extended or adjusted under 35 U.S.C. 154(b) by 543 days.

(21) Appl. No.: 12/439,979

(22) PCT Filed: Sep. 18, 2007

(86) PCT No.: PCT/KR2007/004508
§ 371 (c)(1),
(2), (4) Date: Mar. 4, 2009

(87) PCT Pub. No.: WO2008/035900
PCT Pub. Date: Mar. 27, 2008

(65) Prior Publication Data
US 2011/0003605 A1    Jan. 6, 2011

(30) Foreign Application Priority Data
Sep. 20, 2006    (KR) .................. 10-2006-0091467

(51) Int. Cl.
*H04B 7/00*    (2006.01)
(52) U.S. Cl. ....................................... 455/522; 455/561
(58) Field of Classification Search .................. 455/522, 455/561, 562.1; 370/321, 318
See application file for complete search history.

(56) References Cited

U.S. PATENT DOCUMENTS

| 6,442,397 B1* | 8/2002 | Benveniste | 455/522 |
|---|---|---|---|
| 6,865,393 B1 | 3/2005 | Baum et al. | |
| 7,085,581 B2* | 8/2006 | Vanghi | 455/522 |
| 7,809,327 B2* | 10/2010 | Lee et al. | 455/7 |
| 2005/0105589 A1 | 5/2005 | Sung et al. | |
| 2006/0078059 A1 | 4/2006 | Ok et al. | |

FOREIGN PATENT DOCUMENTS

| JP | 2004-072724 A | 3/2004 |
|---|---|---|
| JP | 2006-211210 A | 8/2006 |
| KR | 1020050048357 A | 5/2005 |
| WO | WO 2005/020490 A1 | 3/2005 |

OTHER PUBLICATIONS

International Search Report for PCT application PCT/KR2007/004508 filed Sep. 18, 2007.
Written Opinion of the International Searching Authority for PCT application PCT/KR2007/004508 filed Sep. 18, 2007.

* cited by examiner

*Primary Examiner* — Brian Young

(57) ABSTRACT

A method and apparatus of allocating downlink power in a radio access station system are disclosed. The method of allocating transmission power to a plurality of terminals in a radio access station system according to the present invention includes (A-1) calculating an allocation power for the respective terminals based on downlink quality information of the respective terminals; (A-2) calculating a minimum requirement power for the respective terminals based on the downlink quality information; and (A-3) allocating the transmission power by distributing part of excess power of a first terminal group having the allocation power higher than the minimum requirement power to the second terminal group having the allocation power lower than the minimum requirement power, and the part of excess power is a sum of insufficient power of the second terminal group. As a result, the loss of the quantity of service transmission of the radio access station is reduced and service areas can be expanded.

27 Claims, 6 Drawing Sheets

[Fig. 1]
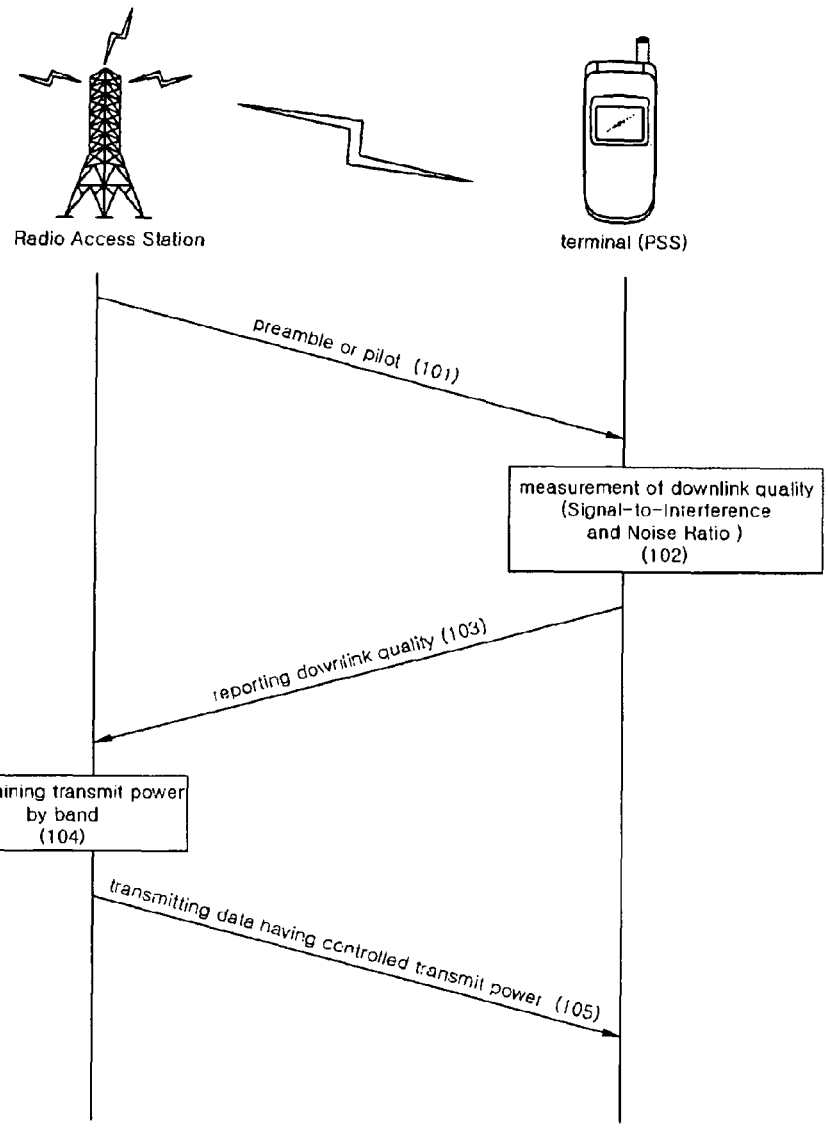
[Fig. 2]
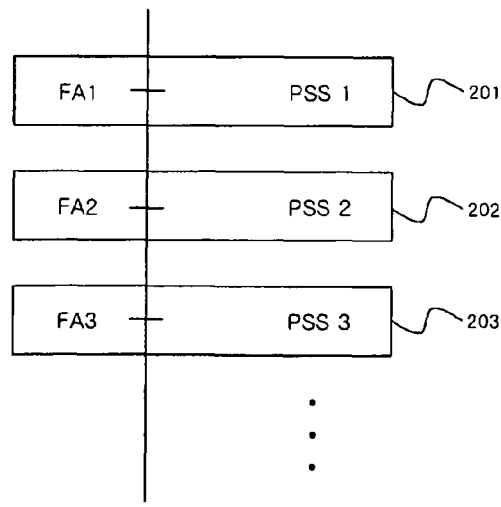

[Fig. 3]
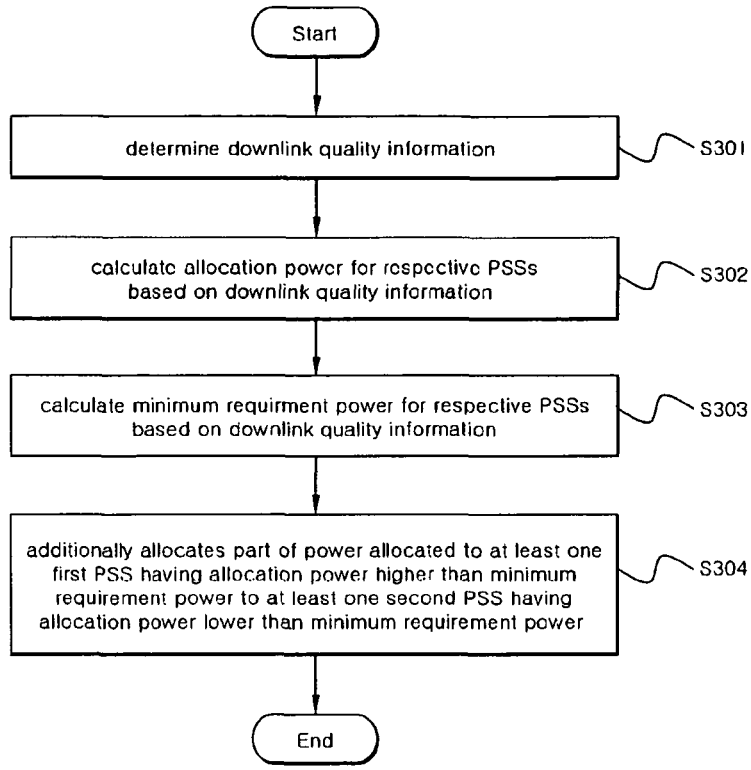
[Fig. 4]
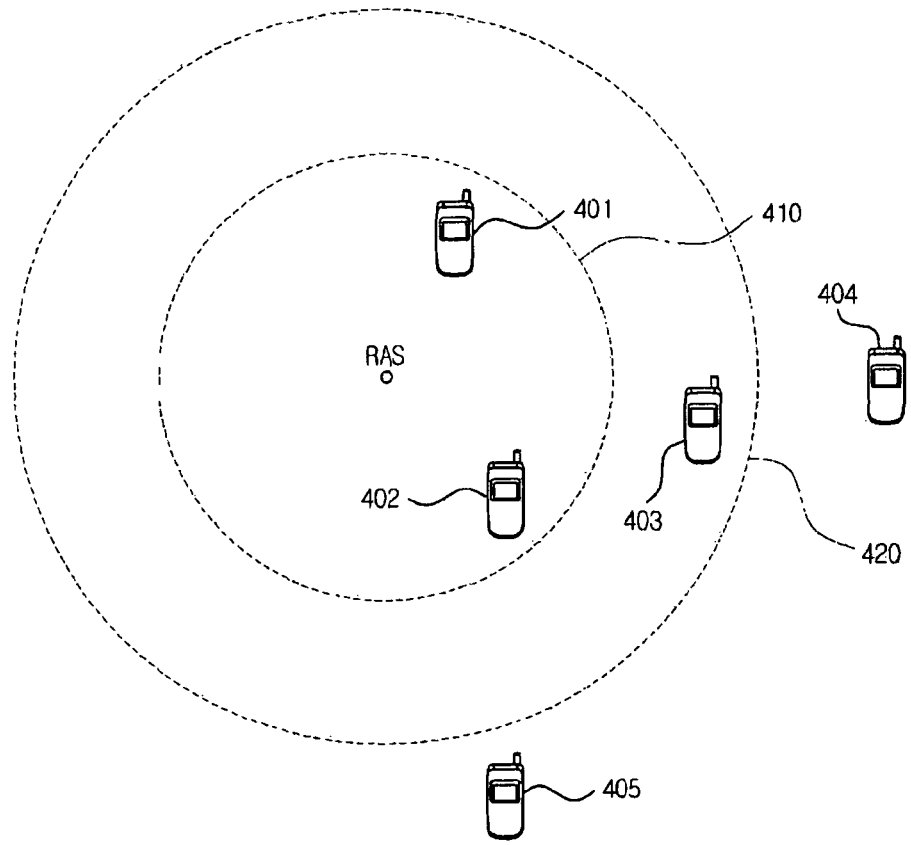

[Fig. 5]
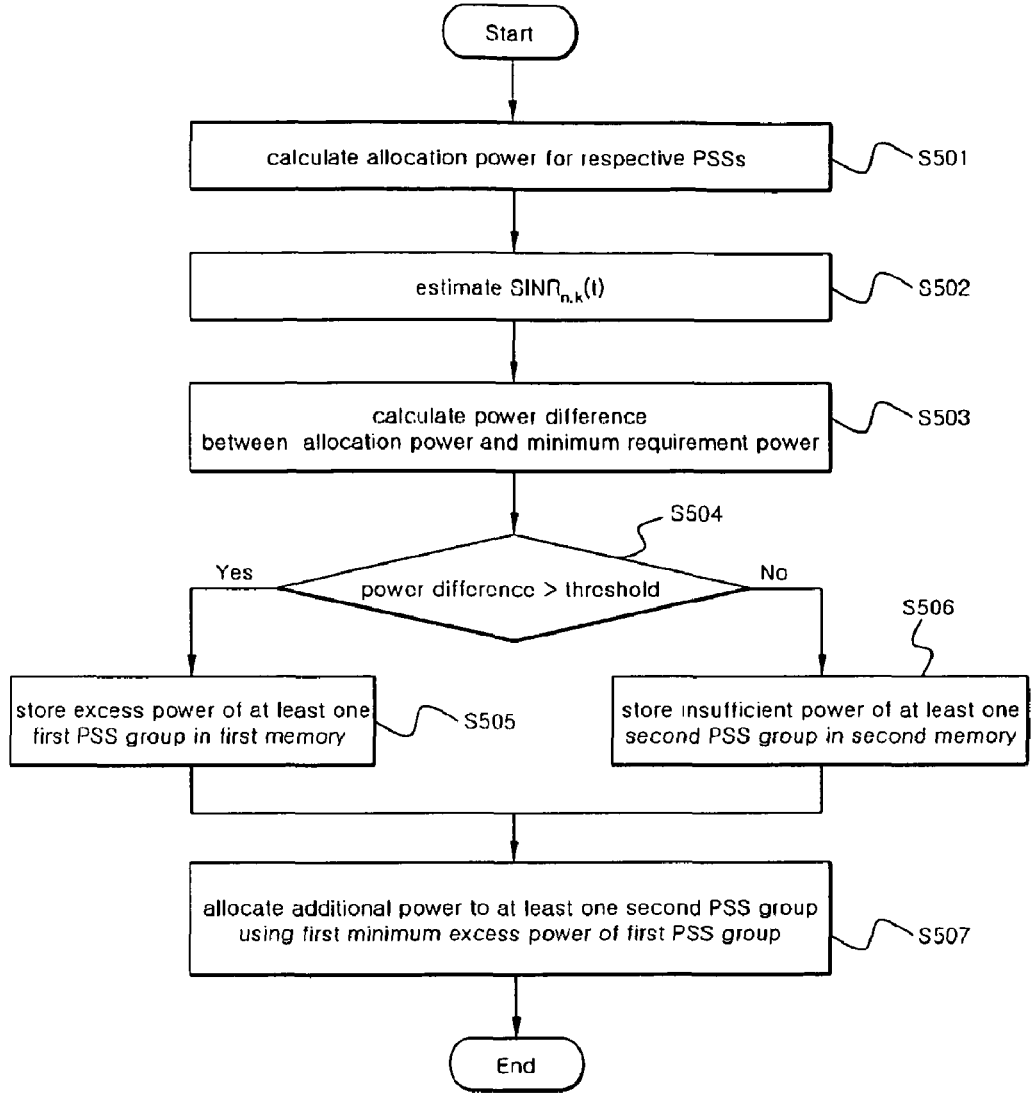

[Fig. 6]
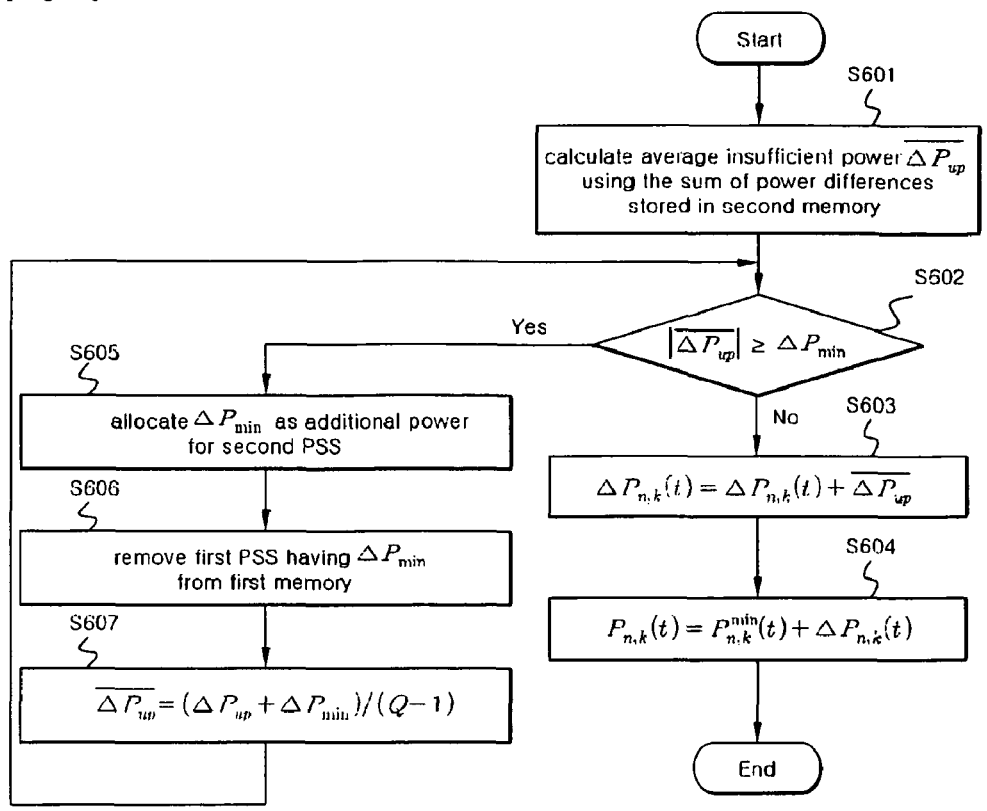

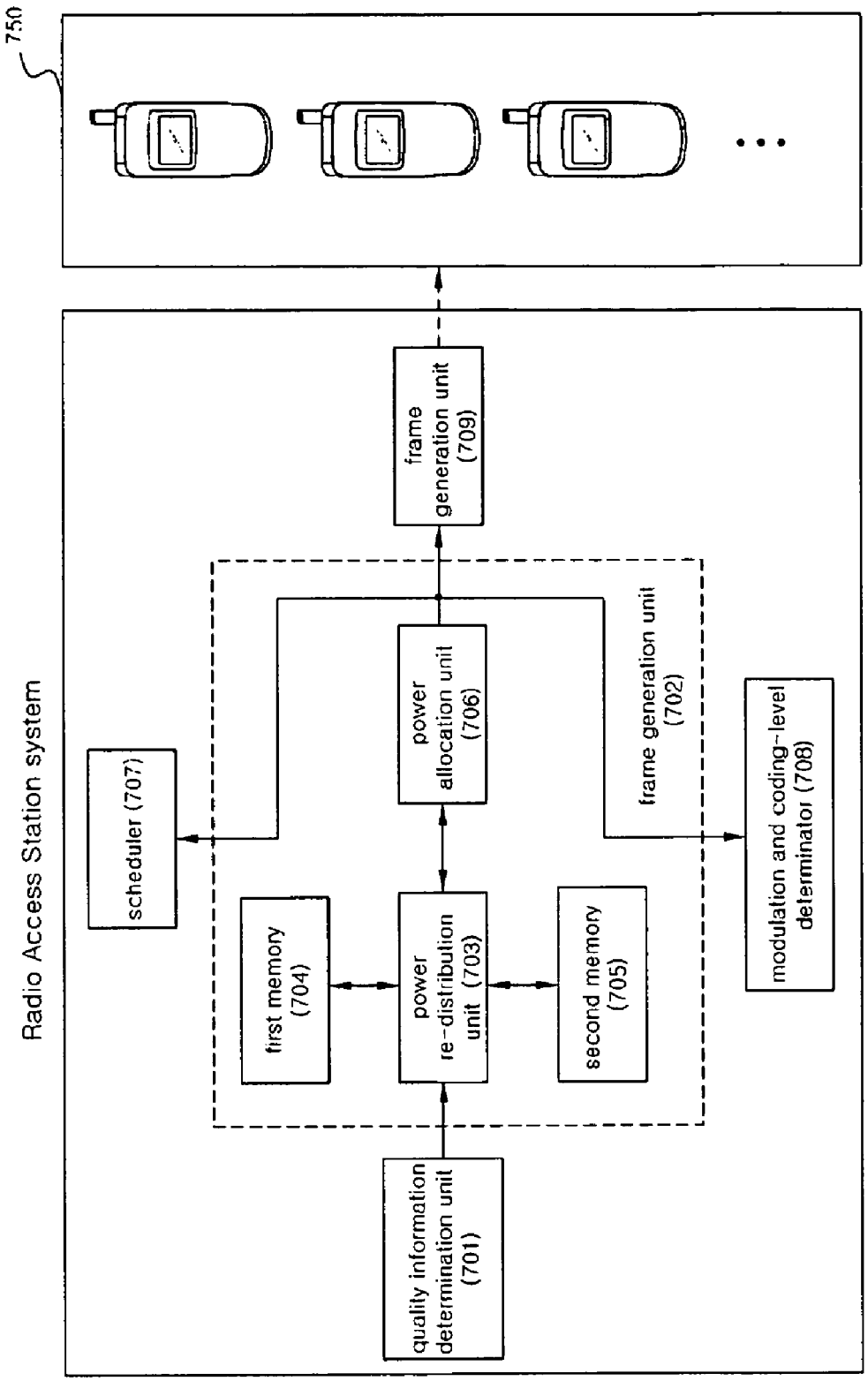
[Fig. 7]

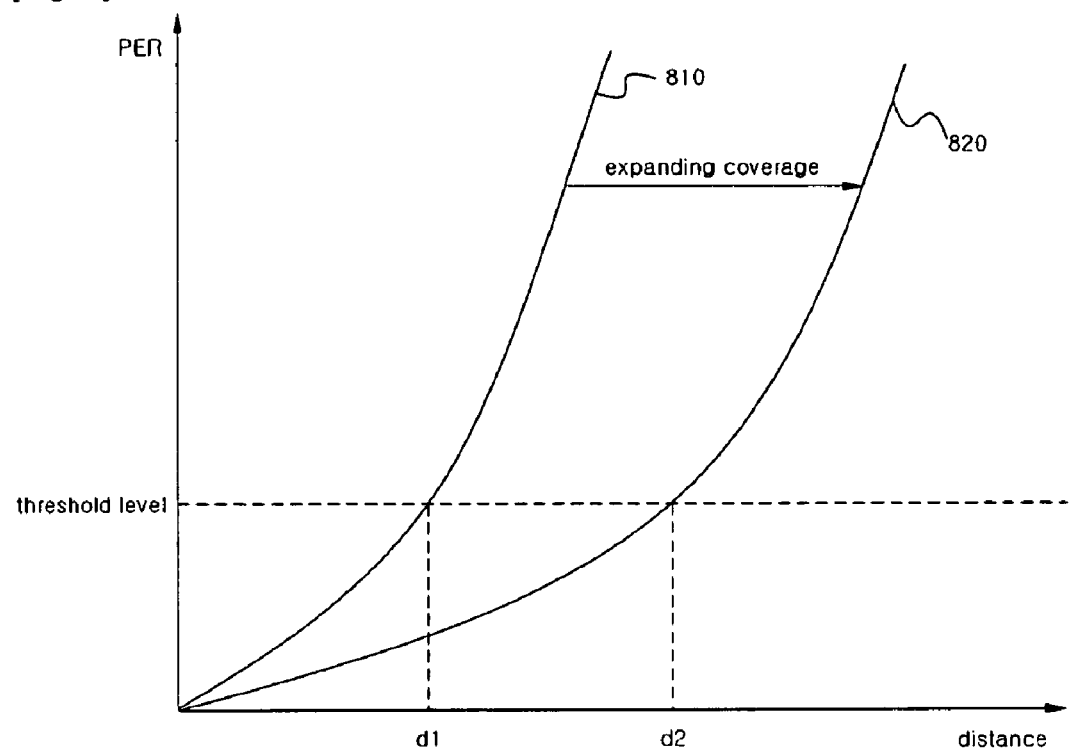
[Fig. 8]

METHOD AND APPARATUS FOR ALLOCATING DOWNLINK POWER IN WIRELESS COMMUNICATION SYSTEM

TECHNICAL FIELD

The present invention relates, in general, to wireless communication systems, and, more particularly, to a method and apparatus for allocating downlink power to expand a cell coverage and to reduce loss of transmission in a base station system for Orthogonal Frequency Division Multiple Access (OFDMA) according to IEEE 802.16d/e, WiBro, WiMAX standard specification.

BACKGROUND ART

In mobile communication systems, resources is frequency bands, the method for efficiently allocating limited frequency bands between users to use is a multiple access, and the connections method for distinguishing the connections of uplinks and downlinks in bi-directional communications is a multiplexing. A wireless multiple access and multiplexing scheme is platform technology which is the basis of wireless transmission technology for efficient usage of limited frequency bands, and is determined based on allocated frequency bands, the number of users, transmission rate, mobility, cell structures, radio environment, or the like. Orthogonal Frequency Division Multiplexing (OFDM), which is one of wireless transmission methods, is a kind of method of Multi Carrier Transmission/Modulation (MCM) methods using several carriers, and is to arrange pieces of input data in a row according to the number of carriers to be used, load data in respective carriers and transmit them. According to the multiple access scheme of a user, OFMD scheme is classified to OFDM-FDMA, OFDM-TDMA and OFDM-CDMA.

OFDM-FDMA (OFDMA) among them is suitable for fourth generation macro/micro cellular infra. According to the OFDMA, there is no interference within cells, the efficiency of frequency reuse is high and adaptive modulation is excellent. Furthermore, in order to make up for the weak points of OFDMA, it is possible to increases diversity and decrease the effect of interference between cells by using spread frequency hopping scheme, multiple antenna scheme, coding scheme, or the like. In particular, since OFDMA scheme is suitable in the case where a number of sub-carriers are used, it is effectively applied to wireless communication systems having a large area cell where the time delay spread is relatively big.

FIG. 1 is a diagram illustrating a method of transmitting and receiving data between a terminal (PSS: Personal Subscriber Station) and a Radio Access Station (RAS) using a conventional downlink power allocation method. As illustrated in FIG. 1, the Radio Access Station (RAS) is required to determine transmission power for each terminal for transmission and reception of data with terminals within service coverage. The radio access station transmits a data frame including a preamble or pilot to the terminal at step 101. Therefore, the terminal measures downlink quality information based on the preamble or pilot transmitted from the radio access station at step 102. The downlink quality information includes Signal-to-Interference and Noise Ratio (SINR). The terminal reports the downlink quality information to the radio access station through an uplink channel at step 103. In this case, the terminal reports downlink quality information for each channel to the radio access station with respect to entire frequency bands used by the radio access station at every frame.

The radio access station determines transmission power for each frequency band using the downlink quality information reported by the terminal at step 104. For example, as in FIG. 2, it may be possible to determine transmission power of a terminal 201 corresponding to a first band (FA1), transmission power of a terminal 202 corresponding to a second band (FA2) and transmission power of a terminal 203 corresponding to a third band (FA3) to be different from each other. Each band (FA1, FA2 or FA3) may be divided into several sub-channels. The radio access station performs scheduling according to the transmission power determined for each band and transmits a data frame to a corresponding terminal at step 105.

However, the downlink quality information is transmitted from a terminal to a radio access station through an uplink, so that the terminal must transmits the downlink quality information separately with uplink data which is to be actually transmitted through an uplink. Therefore, from a terminal standpoint, the downlink quality information for report of channel quality acts as additional data on the uplink, thereby resulting in loss of transmission quantity of data. Therefore, it is inefficient for the terminal to transmit downlink quality information for respective channels of entire bands at each frame.

Furthermore, in the prior art, transmission power is allocated in consideration of only one of transmission quantity and a service area rather than in consideration of both transmission quantity and a service area. Therefore, if transmission power for each terminal is allocated according to the conventional power allocation method, the service area is minimized when the transmission quantity of data of the radio access station is maximized, whereas the transmission quantity is minimized when the service coverage is maximized, so that a problem occurs in that the transmission quantity and service coverage can not be simultaneously improved.

DISCLOSURE OF INVENTION

Technical Problem

Accordingly, the present invention has been made keeping in mind the above problems occurring in the prior art, and an object of the present invention is to provide a method and apparatus for allocating downlink power in a radio access station system, which can reduce loss of transmission data quantity and expand a service coverage by allocating minimum requirement power to a terminal, the downlink quality information is relatively low, based on average downlink quality information with respect to entire bands.

Additionally, another object of the present invention is to provide a method and apparatus for allocating downlink power in a radio access station system, which can expand service coverage without loss of data transmission quantity by allocating part of power for a terminal to which power higher than minimum requirement power is allocated as additional power for a terminal to which power lower than minimum requirement power is allocated.

Technical Solution

According to an aspect of the present invention, there is provided a method of allocating transmission power to a plurality of terminals in a radio access station system, the method including: (A-1) calculating an allocation power for the respective terminals based on downlink quality information of the respective terminals; (A-2) calculating a minimum requirement power for the respective terminals based on the downlink quality information; and (A-3) allocating the transmission power by distributing part of excess power of a first terminal group having the allocation power higher than the minimum requirement power to the second terminal group having the allocation power lower than the minimum requirement power, and the part of excess power is a sum of insufficient power of the second terminal group.

According to another aspect of the present invention, there is provided a method of allocating transmission power to a plurality of terminals in a radio access station system, the method including: (C-1) calculating power differences between an allocation power and a minimum requirement power of respective terminals; (C-2) sequentially storing power differences, in which the allocation power of respective terminals is higher than the minimum requirement power, as excess power of a first terminal group, and sequentially storing power differences, in which the allocation power of respective terminals is lower than the minimum requirement power, as insufficient power of a second terminal group; and (C-3) allocating power acquired by subtracting a sum of the insufficient power from the excess power, and allocating the minimum requirement power to the second terminal group.

According to another aspect of the present invention, there is provided a radio access station system communicating with a plurality of terminals, the radio access station system comprising: a quality information determination unit for determining downlink quality information of respective terminals; and a power determination unit for calculating an allocation power and a minimum requirement power of the respective terminals based on the downlink quality information, and determining a transmission power of the respective terminals based on a power difference between the allocation power and the minimum requirement power, wherein the power determination unit determines the transmission power by distributing part of excess power of a first terminal group having the power difference higher than a threshold to a second terminal group as much as insufficient power of a second terminal group having the power difference lower than the threshold.

Advantageous Effects

As described above, in the radio access station according to the present invention, the method and apparatus for allocating transmission power to respective terminals performs correction such that the transmission power of a terminal having low downlink quality approaches minimum requirement power enabling the terminal to communicate with the radio access station, thereby expanding a service coverage while maximizing the quantity of transmission data of the radio access station.

Furthermore, in the radio access station according to the present invention, the method and apparatus for allocating transmission power to respective terminals re-distributes the allocation power of respective terminals based on average downlink quality information for entire bands received from the respective terminals, thereby properly controlling the quantity of transmission data and a service coverage, and performing communication while maximally reducing loss of the quantity of transmission data.

Furthermore, in the radio access station according to the present invention, the method and apparatus for allocating transmission power to respective terminals employ a method of allocating power for terminals and for bursts of entire bands rather than allocating power for respective channels, so that there is advantage in that the system structures of the radio access station and the terminal are all simplified.

In the radio access station according to the present invention, the method and apparatus for allocating transmission power to respective terminals are advantageous in that the radio access station for relaying portable Internet services according to IEEE 802.16d/e, WiBro, WiMAX standard specification can provide high quality of communication services.

BRIEF DESCRIPTION OF THE DRAWINGS

FIG. 1 is a diagram illustrating a method of transmitting and receiving data between a terminal and a Radio Access Station (RAS) using a conventional downlink power allocation method;

FIG. 2 is a flowchart illustrating a method of determining power for each band in the radio access station of FIG. 1;

FIG. 3 is a flowchart illustrating a method of allocating downlink power according to an embodiment of the present invention;

FIG. 4 is a diagram illustrating connection between the radio access station which transmits data according to transmission power allocated to each terminal in FIG. 3 and a terminal;

FIG. 5 is a flowchart illustrating a procedure of re-distributing power to respective terminals according to an embodiment of the present invention;

FIG. 6 is a flowchart illustrating specific steps in the procedure of re-distributing power of FIG. 5;

FIG. 7 is a block diagram illustrating a radio access station system according to an embodiment of the present invention; and FIG. 8 is a graph of relation between distance and PER illustrating expansion of coverage in the radio access station system according to the embodiment of the present invention.

MODE FOR THE INVENTION

Hereinafter, an exemplary embodiment of the present invention will be described in detail with reference to the accompanying drawings. Well known functions and constructions are not described in detail since they would obscure the invention in unnecessary detail.

A radio access station system according to an embodiment of the present invention corresponds to a base station applicable to Orthogonal Frequency Division Multiple Access (OFDMA) wireless communication systems according to the IEEE 802.16d/e, WiBro, WiMAX standard specification. The radio access station according to present invention determines transmission power for each terminal using a power re-distribution method to be described below.

The radio access station according to the embodiment of the present invention allocates uniform power to respective terminals within overall power available in the radio access station based on respective downlink quality information received from the terminals. In this case, the radio access station allocates power to respective terminals so that Shannon Capacity $C_n$ as expressed in Equation 1, which corresponds to the quantity of transmission data of an n-th radio access station is a maximum. $C_n$ is used to determine a maximum transmission rate in a channel having a noise.

$$C_n(P_{n,k}) = \sum_{k=1}^{K} \frac{B}{K} \log_2(1 + SINR_{n,k})$$ [Equation 1]

where $P_{n,k}$ is downlink power of a k-th terminal served by an n-th radio access station, K is the number of all terminals served by the n-th radio access station, B is a transmission frequency band, and $SINR_{n,k}$ is a signal-to-interference and noise ratio which is the downlink quality information of the k-th terminal which belongs to the n-th radio access station.

In this case, the radio access station allocates power to corresponding terminals such that $C_n$ is a maximum within overall power $P_n^{max}$, as expressed in Equation 2, available in the radio access station based on the respective downlink quality information received from terminals.

$$P_{n,k}^* = \frac{1}{K}\left(P_n^{max} + \sum_{l=1}^{K}\frac{1}{SINR_{n,l}}\right) - \frac{1}{SINR_{n,k}} \quad \text{[Equation 2]}$$

As described above, when power is allocated to respective terminals using Equation 2, large power can be allocated to terminals having a desired downlink quality, however, the number of terminals to be served become reduced. The reason for this is that the coverage of a radio access station is not expanded, and the overall power of the radio access station is allocated to all terminals currently served by the radio access station, so that large power is allocated to only terminals having a desired downlink quality.

In order to correct this, a restrictive condition, such as $SINR_{n,k} \geq SINR_{min}$, is used. $SINR_{min}$ is a minimum signal-to-interference and noise ratio which can be provided by a radio access station. The radio access station may determine the level of other modulation and coding according to the signal-to-interference and noise ratio. The minimum signal-to-interference and noise ratio is a minimum level of modulation and coding which can be served by a radio access station. For example, when QPSK 1/12 scheme is served, services can be provided to corresponding terminals only when a signal-to-interference and noise ratio is at least higher than −3.9 dB. Therefore, even if the number of entire terminals, which are provided with services, is increased through expansion of the coverage of a radio access station, the signal-to-interference and noise ratios of all terminals needs to be higher than −3.9 dB in order to allocate the power such that the respective signal-to-interference and noise ratios of an increased number of terminals is at least −3.9 dB.

In summary, a condition equation for allocation of power to respective terminals can be represented as follows.

$$\max_{P_{n,k}} \sum_{n=1}^{N} C_n(P_{n,k}) \text{ s.t. } \sum_{k=1}^{K} P_{n,k} \leq P_n^{max}; \quad SINR_{n,k}(P_{n,k}) \geq SINR_{min}$$

According to the above-described condition equation, when the power $P_{n,k}$ is allocated to respective terminals in order that Shannon Capacity $C_n$ becomes a maximum, the sum of power which is to be allocated to the respective terminals preferably does not exceed the overall power $P_n^{max}$, which the radio access station can allocates, and the signal-to-interference and noise ratio $SINR_{n,k}$ for respective terminals is higher than a minimum signal-to-interference and noise ratio $SINR_{min}$ which the radio access station can provide. In case the above-described power allocation method is applied, the radio access station can allocate transmission power to respective terminals which satisfying the optimal quantity of transmission data and an optimal service coverage as described below.

Hereinafter, an actual implementation algorithm of the power allocation method is described with reference to FIG. 3 to FIG. 6.

FIG. 3 is a flowchart illustrating a method of allocating downlink power according to an embodiment of the present invention.

A radio access station according to an embodiment of the present invention calculates the allocation power and minimum requirement power of terminals and makes the transmission power of all terminals to be higher than the minimum requirement power based on the allocation power and the minimum requirement power.

In detail, first, the radio access station according to an embodiment of the present invention determines downlink quality information for respective terminals at step 301. The downlink quality information is reported by respective terminals, and is an average SINR (signal-to-interference and noise ratio) for entire frequency bands which is used in the radio access station. In this case, the radio access station records the downlink quality information of respective terminals in predetermined memory and maintains them. Therefore, the present invention does not allocate the power to respective channels, but allocates the power to respective terminals and respective bursts with respect to entire band, thereby simplifying the structure of a system relating to the transmission and reception of data.

In other words, according to the present invention, there is no need for respective terminals to transmit downlink quality information for respective channels at every frame with respect to entire frequency band, so that a radio access station can have a simplified structure for reception of downlink quality information, allocation power for respective channels and for respective terminals, and data modulation, and the like.

Then, the radio access station calculates allocation power for respective terminals based on the downlink quality information at step 302. The radio access station allocates power $P_{n,k}$ to respective terminals using the condition equation. If $SINR_{n,k} \geq SINR_{min}$ is eliminated from the condition equation, Equation 3 can be acquired as follows:

$$P_{n,k}^* = \frac{1}{K}\left(P_n^{max} + \sum_{l=1}^{K}\frac{P_{n,l}^*}{SINR_{n,l}}\right) - \frac{P_{n,k}^*}{SINR_{n,k}} \quad \text{[Equation 3]}$$

However, since the optimal solution $P_{n,k}^*$ exists in both the right side and the left side of [Equation 3], it is difficult to obtain the optimal solution. Therefore, it is required that Equation 3 is converted into Equation 4.

In this case, in order to calculate the allocation power at time t which is the current time point, according to Equation 4, the radio access station can calculate the allocation power $P_{n,k}(t)$ by using SINR $SINR_{n,k}(t-d)$ and the power $P_{n,k}(t-d)$, when $SINR_{n,k}(t-d)$ is a SINR for respective terminals before the present time, that is, is a SINR for respective terminals in the time point which is ahead of time t by time d.

Actually, since it is impossible that the actual SINR of the time point t is reflected to the allocation power, the allocation power $P_{n,k}(t)$ is calculated by using SINR which is resorted before time point t.

$$P_{n,k}(t) = \frac{1}{K}\left(P_n^{max} + \sum_{l=1}^{K} \frac{1}{SINR'_{n,l}(t-d)}\right) - \frac{1}{SINR_{n,k}(t-d)} \quad \text{[Equation 4]}$$

where $P_{n,k}(t)$ corresponds to the power which is to be allocated at current time, for example, time point t at which the downlink quality information is reported. In this case, $P_n^{max}$ is overall power which the radio access station can allocate, and $SINR_{n,k}'(t-d)=SINR_{n,k}(t-d)/P_{n,k}(t-d)$.

In other words, $SINR_{n,k}'(t-d)$ is a value resulting from division of $SINR_{n,k}(t-d)$, which is SINR measured by terminal at time (t−d) and reported to the radio access station, by $P_{n,k}(t-d)$ which is the power allocated at the same time. In this case, power $P_{n,k}(t-d)$ at time (t−d) is transmission power at time (t−d), which is actually re-distributed based on the allocation power and allocated as described below. K is the number of all terminals served by the radio access station.

The radio access station estimates $SINR_{n,k}(t)$ at time point t using allocation power $P_{n,k}(t)$ of respective terminals and SINR reported to the radio access station. The signal-to-interference and noise ratio $SINR_{n,k}(t)$ can be calculated using Equation 5 as follows:

$$SINR_{n,k}(t) = SINR_{n,k}(t-d)\frac{P_{n,k}(t)}{P_{n,k}(t-d)} \quad \text{[Equation 5]}$$

Furthermore, the radio access station calculates a minimum requirement power $P_{n,k}^{min}(t)$ for respective terminals based on the downlink quality information at step 303. At this time, according to Equation 6, the radio access station can calculate the minimum requirement power $P_{n,k}^{min}(t)$ using $SINR_{n,k}'(t-d)$ which is SINR for respective terminals at time (t−d), power $P_{n,k}(t-d)$ at corresponding time and $SINR_{min}$ which is a minimum SINR. In this case, the $SINR_{min}$ is a value calculated as a minimum signal-to-interference and noise ratio, with which communication is possible by using Equation 5.

$$P_{n,k}^{min}(t) = \frac{P_{n,k}(t-d)}{SINR_{n,k}(t-d)}SINR_{min} \quad \text{[Equation 6]}$$

The minimum requirement power $P_{n,k}^{min}(t)$ is minimum power required to communicate with the radio access station, and means that it is possible to communicate with the radio access station only when the transmission power allocated to respective terminals is equal to and higher than the minimum requirement power $P_{n,k}^{min}(t)$ $(P_{n,k}(t) \geq P_{n,k}^{min}(t))$.

Then, the radio access station classifies terminals (($P_{n,k}(t) > P_{n,k}^{min}(t)$), the calculated allocation power of which is higher than the minimum requirement power into a first terminal group, and terminals ($P_{n,k}(t) \leq P_{n,k}^{min}(t)$), the calculated allocation power of which is equal to or lower than the minimum requirement power into a second terminal group, and then allocates the excess power ($\Delta P_{n,k}(t) = P_{n,k}(t) - P_{n,k}^{min}(t)$) of the first terminal group to the second terminal group at step 304. Whether the allocation power $P_{n,k}(t)$ of respective terminals exceeds the minimum requirement power $P_{n,k}^{min}(t)$ can be determined from the power difference $\Delta P_{n,k}(t)$ between the allocation power $P_{n,k}(t)$ and the minimum requirement power $P_{n,k}^{min}(t)$ using Equation 7 as follows.

$$\begin{aligned}\Delta P_{n,k}(t) &= P_{n,k}(t) - \frac{P_{n,k}(t-d)}{SINR_{n,k}(t-d)}SINR_{min} \\ &= P_{n,k}(t) - P_{n,k}^{min}(t)\end{aligned} \quad \text{[Equation 7]}$$

Therefore, in case the power difference $\Delta P_{n,k}(t)$ is higher than a threshold value, it is determined as the first terminal group having the allocation power $P_{n,k}(t)$ higher than the minimum necessary power $P_{n,k}^{min}(t)$, while in case the power difference $\Delta P_{n,k}(t)$ is lower than the threshold value, it is determined as the second terminal group having the allocation power $P_{n,k}(t)$ lower than the minimum necessary power $P_{n,k}^{min}(t)$.

According to the present invention, the threshold value may be determined to be a proper value by the radio access station. For example, if the power difference $\Delta P_{n,k}(t)$ is higher than 0, it is determined as the first terminal group, and if the power difference $\Delta P_{n,k}(t)$ is equal to or lower than 0, it is determined as the second terminal group. If the power difference $\Delta P_{n,k}(t)$ is higher than 0 with respect to all terminals, the allocation power for all terminals is higher than the minimum requirement power, so that respective terminals can perform communication on a desired channel state, and there is no need to correct the allocation power for respective terminals. In this case, the allocation power $P_{n,k}(t)$ is allocated to transmission power for respective terminals.

However, in most cases, since a bad communication environment including a signal interference or a dead spot is expected, terminals having power differences $\Delta P_{n,k}(t)$ which is lower than 0 exist, so that the allocation power $P_{n,k}(t)$ for respective terminals is corrected as described below.

According to the present invention, the radio access station corrects the allocation power of the second terminal group using the minimum excess power of the first terminal group. The minimum excess power is the corresponding power difference of a terminal having a lowest power difference $\Delta P_{n,k}(t)$ among terminals determined as the first terminal group. The minimum excess power can be allocated as the additional power of the second terminal group. In this case, when a first minimum excess power having a lowest power difference $\Delta P_{n,k}(t)$ is allocated to the second terminal group as additional power, second, third, . . . minimum excess power of the remaining terminals of the first terminal group can be used as power to be allocated to the second terminal group. The second minimum excess power has the lowest power difference $\Delta P_{n,k}(t)$ next to the first minimum excess power among the first terminal group, and the third minimum excess power has a low power difference $\Delta P_{n,k}(t)$ next to the second minimum excess power, corresponding to the first terminal group.

Therefore, the transmission power of the second terminal group to which the additional power is allocated, is corrected to the minimum requirement power $P_{n,k}^{min}(t)$.

For example, when a minimum SINR for service based on QPSK 1/12 scheme is −3.9 dB, in case the SINR of any one of the second terminal group is reported to be lower than −3.9 dB, the corresponding terminal can not be provided with data services based on QPSK 1/12 scheme because the terminal is not allocation power which enables the terminal to be provided with data service based on QPSK 1/12 scheme according to the related art. However, according to the present invention, the second terminal group is allocated additional power from the first terminal group having excess power, so that, as described above, transmission can be perform with power higher than the minimum requirement power $P_{n,k}^{min}(t)$, thereby enabling the second terminal group to receive data service based on QPSK 1/12 scheme.

The QPSK 1/12 is a method for modulation and coding, and a radio access station employs 16-QAM (Quadrature Amplitude modulation) scheme, 64-QAM scheme, or the like as a higher level of modulation and coding.

At this time, the first terminal group is allocated one of 1) the allocation power $P_{n,k}(t)$, 2) the minimum requirement power $P_{n,k}^{min}(t)$, 3) power acquired by subtracting the additional power allocated to the second terminal group from the allocation power $P_{n,k}(t)$, as transmission power.

For example, in case of 1), it is the case in which the excess power of any one of the first terminal group is not distributed to the second terminal group as additional power, and the allocation power $P_{n,k}(t)$ acquired using Equation 4 is determined as the transmission power for the corresponding terminal.

In case of 2), it is the case in which the excess power of any one of the first terminal group is distributed to the second terminal group as additional power, and the minimum requirement power $P_{n,k}^{min}(t)$ is determined as the transmission power for the corresponding terminal.

In case of 3), it is the case in which only part of the excess power of any one of the first terminal group is distributed to the second terminal group as additional power, and power resulting from subtraction of additional power distributed to the second terminal group from the allocation power acquired using Equation 4 is determined as the transmission power for the corresponding terminal.

As in FIG. 4, terminals 401 and 402 belong to the above-described first terminal group. The terminal 403 belongs to, for example, the above-described second terminal group. The radio access station allocates the excess power of the terminal 401 which is located in a coverage 410 of good communications, or the terminal 402 which is supplied with the power exceeding the minimum requirement power among the terminals 401 and 402, to the terminal 403 which is allocation power lower than the minimum requirement power and does not have good communications, thereby expanding a substantial coverage 420.

That is, the radio access station allocates the excess power of the terminals 401 and/or 402, the allocation power of which are higher than the minimum requirement power $P_{n,k}^{min}(t)$, to the terminal 403, the allocation power of which is lower than the minimum requirement power $P_{n,k}^{min}(t)$ not to enable the terminal 403 to perform communication well as an additional power, thereby communicating with the terminal with which the radio access station is hard to communicate.

As a result, there is the desired effect in that service coverage is expanded while the quantity of data transmission to all terminals is not greatly changed. That is, the quantity of data transmission of the terminals 401 and 402, which is being provided with desired service, is large since the level of the modulation and coding is high. In order to maximally suppress the reduction of the quantity of data transmission to the terminals 401 and 402 within a range in which the loss of overall data-transmission quantity is minimized, the radio access station sequentially uses from the excess power of a terminal having lowest excess power among the excess power of the terminals 401 and 402. In other word, the excess power of a terminal having lowest excess power among terminals having excess power is firstly used for expansion of coverage and then excess power higher than the lowest power is sequentially used.

In FIG. 4, for example, in order to expand an area in which service can be received from a radio access station, the power for the terminals 401 and 402 can be allocated as the additional power of the terminals 404 and 405, but the area of the terminal 403 only can be expanded to the coverage of the radio access station in consideration of the whole transmission quantity of the radio access station and the proper service reception available area.

FIG. 5 is a flowchart illustrating a procedure of re-distributing power to respective terminals according to an embodiment of the present invention.

The radio access station according to the embodiment of the present invention calculates a power difference value $$\Delta P_{n,k}(t) \ (\Delta P_{n,k}(t) = P_{n,k}(t) \ P_{n,k}^{min}(t))$$

between allocation power $P_{n,k}(t)$ of respective terminals and minimum requirement power $$P_{n,k}^{min}(t),$$

and compares the power difference value $$\Delta P_{n,k}(t)$$

with a threshold, for example, 0. When the excess power is higher than the threshold, for example, $$\Delta P_{n,k}(t)$$

>0, the radio access station re-distributes excess power to terminals having insufficient allocation power, thereby performing correction such that a terminal having the allocation power $P_{n,k}(t)$ lower than minimum requirement power $$P_{n,k}^{min}(t)$$

is allocated power up to the minimum requirement power $$P_{n,k}^{min}(t).$$

In detail, first, the radio access station according to an embodiment of the present invention calculates allocation power $P_{n,k}(t)$ for respective terminals using Equation 4 at step 501. Next, the radio access station estimates $SINR_{n,k}(t)$ at time t using the allocation power $P_{n,k}(t)$ for respective terminals and SINR reported to the radio access station according to Equation 5 at step 502. Then, the radio access station calculates the power difference $$\Delta P_{n,k}(t)$$

between the allocation power $P_{n,k}(t)$ and the minimum requirement power $$P_{n,k}^{min}(t)$$

using Equation 7.

Thereafter, the radio access station determines whether the power difference $$\Delta P_{n,k}(t)$$

exceeds the threshold at step 504. When the power difference $$\Delta P_{n,k}(t)$$

exceeds the threshold, for example, 0, the allocation power $P_{n,k}(t)$ is higher than the minimum requirement power $$P_{n,k}^{min}(t),$$

so that communication between the corresponding terminal and the radio access station is maintained in a desired channel state without obstruction preventing communication. When the power difference $$\Delta P_{n,k}(t)$$

is lower than the threshold, for example, 0, the allocation power $P_{n,k}(t)$ of a corresponding terminal is lower than the minimum requirement power $$P_{n,k}^{min}(t),$$

so that it shows that communication between the corresponding terminal and the radio access station is interrupted and bad channel state is maintained. In this case, when the power differences $$\Delta P_{n,k}(t)$$

of all terminals exceeds the threshold $$(\Delta P_{n,k}(t)$$

$\geq 0$ for all k$\forall$K), the allocation power $P_{n,k}(t)$ of all terminals ensures a minimum SINR, thereby there being no need to perform following steps.

However, when the power difference $$\Delta P_{n,k}(t)$$

for one terminal is lower than the threshold, the following steps are performed in order that the allocation power for respective terminals is properly corrected, thereby enabling a terminal which is hard to perform communication to perform communication.

The radio access station generates a first list (LISTdown) for the excess power of a first terminal group having the power difference $$\Delta P_{n,k}(t)$$

which exceeds a threshold, and stores it in first memory at step 505. The radio access station generates a second list (LISTup) for the insufficient power of a second terminal group having the power difference $$\Delta P_{n,k}(t)$$

which is lower than the threshold, and stores it in second memory at step 506.

The first list is information which are arranged with related to the excess power of the first terminal group, the power difference $$\Delta P_{n,k}(t)$$

of which exceeds the threshold and are stored in the first memory. The second list is information which are arranged with related to the insufficient power of the second terminal group, the power difference $$\Delta P_{n,k}(t)$$

of which is lower than the threshold and are stored in the second memory.

First, the radio access station additionally allocates the power to the second terminal group corresponding to the second list using the first minimum excess power of the first list at step 507. The fist minimum excess power corresponds to the lowest excess power that is the power difference which is the lowest among the first list stored in the first memory. According to the embodiment of the present invention, when the first minimum excess power is all used up for the second terminal group, the subsequent second minimum excess power stored in the first memory can be additionally distributed to the second terminal group.

FIG. 6 is a flowchart illustrating specific steps in the procedure of re-distributing power of FIG. 5.

In order to re-distribute the allocation power of respective terminals, the radio access station calculates average insufficient power $\Delta P_{up}$ from the sum of the insufficient power of the second list stored in the second memory as described in FIG. 5 at step 601. The average insufficient power $\overline{\Delta P_{up}}$ is obtained by dividing the overall insufficient power of the second terminal group by the number of the terminals included in the first terminal group, and corresponds to average power to be allocated to the second terminal group by the first terminal group.

If the excess power of the first list stored in the first memory is distributed to the terminals of the second terminal group as additional power as much as the average insufficient power $\overline{\Delta P_{up}}$, it means that the terminals of the second terminal group which is distributed with the additional power can communicate with the radio access station in a desired channel state. When Q is the number of terminals having excess power, stored in the first memory, and $\Delta P_{up}$ is the sum of insufficient power stored in the second memory, the average insufficient power $\overline{\Delta P_{up}}$ can be calculated by dividing the sum of the insufficient power by the number Q of terminals by using Equation 8. In this case, the number of terminals of the second terminal group is K-Q. In case, at step 504, the threshold is 0, the sum of insufficient power $\Delta P_{up}$ stored in the second memory has a negative value, so that the average insufficient power $\Delta P_{up}$ also has a negative value.

$\overline{\Delta P_{up}} = \Delta P_{up}/Q$ [Equation 8]

When the average insufficient power $\overline{\Delta P_{up}}$ is calculated by using Equation 8 as described above, the radio access station determines whether the absolute value $|\overline{\Delta P_{up}}|$ of the average insufficient power $\overline{\Delta P_{up}}$ is equal to or higher than a first minimum excess power, that is, $|\overline{\Delta P_{up}}| \geq$ $\Delta P_{min}$ at step 602.

When the absolute value $|\overline{\Delta P_{up}}|$ of the average insufficient power $\Delta P_{up}$ is equal to or higher than the first minimum excess power at step 602, the first minimum excess power is additionally distributed to the second terminal group at step 605. In this case, the corresponding terminal of the second terminal group which is distributed with the additional power is allocated minimum requirement power $P_{n,k}^{min}(t)$ as transmission power. Furthermore, the transmission power of the corresponding terminal of the first terminal group having the first minimum power is also determined as the minimum requirement power $P_{n,k}^{min}(t)$.

Furthermore, when the first minimum excess power is used in the second terminal group, the radio access station removes the corresponding terminal from the first memory, and stores it in the second memory at step 606. When the first minimum excess power is all used up for the second terminal group, the terminal is not needed to be stored in the first list of the first memory storing excess power having the power difference $\Delta P_{n,k}(t)$ which is higher than the threshold, so that the radio access station removes the terminal from the first memory and stores it in the second memory.

At step 607, as shown in Equation 9, the radio access station calculates a second average insufficient power $\overline{\Delta P_{up}}$ and uses a second minimum excess power (the second-lowest excess power among the excess power stored in the first memory) stored in the first memory as additional power to be distributed to the second terminal.

$\overline{\Delta P}_{up} = (\Delta P_{up} + \Delta P_{min})/(Q-1)$ [Equation 9]

where the second average insufficient power $\Delta P_{up}$ is obtained by dividing the sum $\Delta P_{up}$

+

$\Delta P_{min}$ in which the sum $\Delta P_{up}$ of insufficient power stored in the second memory is added to the first minimum excess power value distributed at step 605 by the number (Q-1) of terminals representing the excess power stored in the first memory after step 606. As described above, since the terminal having the first minimum excess power is removed from the first list of the first memory, the number of terminals existing in the first list of the first memory is Q-1.

In case the absolute value of the calculated second average insufficient power $\Delta P_{up}$ is equal to or higher than the second minimum excess power, the radio access station distributes the second minimum excess power to the second terminal group stored in the second memory as additional power according to steps 605 to 607. The radio access station re-calculates the average insufficient power $\Delta P_{up}$ until the absolute value of n-th average insufficient power $\overline{\Delta P_{up}}$ is lower than the n-th minimum excess power, and repeatedly compares the recalculated average insufficient power with the third minimum excess power, the fourth, the fifth, . . . .

Therefore, in case the n-th average insufficient power $\overline{\Delta P_{up}}$ is lower than the n-th minimum excess power, the radio access station respectively decreases the excess power $\Delta P_{n,k}(t)$ of the first terminal group stored in the first memory as much as the n-th average insufficient power $\overline{\Delta P_{up}}$ by using Equation 10 at step 603.

$\Delta P_{n,k}(t) = \Delta P_{n,k}(t) + \overline{\Delta P_{up}}$ [Equation 10]

Therefore, although the n-th average insufficient power $\overline{\Delta P_{up}}$ is respectively subtracted from the excess power lastly stored in the first memory, the power to be allocated to the first terminal group stored in the first memory is at least equal to or higher than the minimum requirement power $P_{n,k}^{min}(t)$, and part of excess power can be remained, so that effective power distribution is possible. At the same time, since the power to be allocated to the second terminal group stored in the second memory is also at least equal to or higher than the minimum requirement power $P_{n,k}^{min}(t)$, all terminals are maintained in a desired channel state.

Next, the radio access station finally allocates the transmission power of the respective terminals according to Equation 11 at step 604.

$P_{n,k}(t) = P_{n,k}^{min}(t) + \Delta P_{n,k}(t)$ [Equation 11]

When transmission power is determined according to Equation 11, the sum of the final excess power $\Delta P_{n,k}(t)$ decreased according to Equation 11 and the minimum requirement power $P_{n,k}^{min}(t)$ is determined for the first terminal group as transmission power, and the minimum requirement power $P_{n,k}^{min}(t)$ is determined for the second terminal group as transmission power. As a result, the second terminal group, provided with the additionally allocation power, can communicate with the radio access station in a desired channel state, for example, the minimum modulation level QPSK 1/12.

For example, it is assumed that the number of terminals of the first terminal group corresponding to the first list of the first memory is "5", the first minimum excess power having the lowest power difference value $\Delta P_{n,k}(t)$ in the first memory is "1", the second minimum excess power having the second-lowest power difference value $\Delta P_{n,k}(t)$ is "2", the third minimum excess power is "3", the fourth minimum excess power is "4", the fifth minimum excess power is "5", and the insufficient power of the second terminal group according to the second list of the second memory is total "−10". In this case, the first average insufficient power $\overline{\Delta P_{up}}$ is "−2", so that the absolute value of the first average insufficient power "2" is higher than the first excess power "1". Therefore, the first minimum excess power is removed from the first memory and the first minimum excess power is distributed to the second terminal group as additional power.

Next, the insufficient power of the second terminal group is "−9", and the number of terminals of the first terminal group is "4", and the second average insufficient power $\overline{\Delta P_{up}}$ is "−2.25". Since the absolute value $|\overline{\Delta P_{up}}|$ "2.25" of the second average insufficient power is higher than the second minimum excess power "2", the second minimum excess power is removed from the first memory and the second minimum excess power is distributed to the second terminal group as additional power.

Thereafter, since the insufficient power of the second terminal group is "−7", the number of the terminals of the first terminal group is 3, so that the third average insufficient power $\overline{\Delta P_{up}}$ is "−2.33". The absolute value $|\overline{\Delta P_{up}}|$ "2.23" of the third average insufficient power is lower than the third minimum excess power "3", so that the third average insufficient power is respectively subtracted from the 3 remaining terminals of the first terminal group and, therefore, the result power is distributed to the terminals having insufficient power among the second terminal group as additional power. In the case in which the third average insufficient power is respectively subtracted from the 3 remaining terminals of the first terminal group, transmission power respectively allocated to the 3 remaining terminals become values obtained by respectively adding "0.67", "1.67" and "2.67" to the minimum requirement power $P_{n,k}^{min}(t)$.

As a result, the power is allocated such that the transmission power of all terminals corresponding to the first and second lists is equal to or higher than the minimum requirement power $P_{n,k}^{min}(t)$, so that all terminals can be maintained in a desired channel state.

FIG. 7 is a block diagram illustrating a radio access station system 700 according to an embodiment of the present invention.

Referring to FIG. 7, the radio access station system 700 includes a quality information determination unit 701, a power determination unit 702, a power re-distribution unit 703, first memory 704, second memory 705, a power allocation unit 706, a scheduler 707, a modulation and coding-level determinator 708 and a frame generation unit 709. The radio access station system 700 communicates with respective terminals 750 and relays data upload or download services.

The radio access station system 700 can be applicable to portable Internet systems or radio communication systems using OFDMA scheme according to IEEE 802.16d/e, Wibro, WiMAX standard specification.

The quality information determination unit 701 determines downlink quality information for respective terminals 750. The downlink quality information corresponds to an average Signal-to-Interference-and Noise Ratio (SINR) for entire frequency bands provided by respective terminals as described above. At this time, the radio access station system 700 records and maintains the downlink quality information for respective terminals in predetermined memory.

Furthermore, the power determination unit 702 calculates allocation power $P_{n,k}(t)$ and minimum requirement power $$P_{n,k}^{min}(t)$$

for respective terminals 750 based on the downlink quality information according to Equation 4 and Equation 6. In this case, the power determination unit 702 can calculates the allocation power $P_{n,k}(t)$ and the minimum requirement power $$P_{n,k}^{min}(t)$$

by using $SINR_{n,k}(t)$ and transmission power for respective terminals at the time point (t−d) which is ahead of current time point, for example, the current time point is a time point t at which the downlink quality information is reported, as in Equation 4 and Equation 6.

Therefore, based on the power difference between the allocation power $P_{n,k}(t)$ and the minimum requirement power $$P_{n,k}^{min}(t),$$

the power determination unit 702 re-distributes the allocation power by distributing part of the excess power of the first terminal group, the power difference related to which is higher than a threshold, that is, the excess power of the first terminal group having allocation power equal to or higher than the minimum requirement power $P_{n,k}^{min}(t)$ to the second terminal group as much as the insufficient power of the second terminal group, the power difference related to which is lower than a threshold, that is, the insufficient power of the second terminal group having the allocation power lower than the minimum requirement power $$P_{n,k}^{min}(t),$$

as described above with reference to FIG. 6, thereby determining transmission power for respective terminals.

Furthermore, the scheduler 707 determines the size of burst to be transmitted to respective terminals according to the downlink quality information and the transmission power for the respective terminals. The size of burst corresponds to the size of downlink data frames, and the quantity of data subsequent to a preamble and a Frame Control Header (FCH) to be transmitted to respective terminals is determined based on the size of burst.

Furthermore, the modulation and coding-level determinator 708 determines the level of modulation and coding for respective terminals according to the downlink quality information and the transmission power for the respective terminals. For example, as Modulation and Coding Schemes (MCS) used in portable Internet systems, there are 10 schemes including Quadrature Phase Shift Keying (QPSK) 1/12, 16-QAM, 64-QAM, or the like.

Furthermore, the frame generation unit 709 generates transmission data frames for the respective terminals according to the size of burst and the level of modulation and coding. As described above, the transmission data frame is comprised of a preamble, a FCH, and a body in which data for respective terminals is loaded.

For example, in case the transmission power for terminals is relatively low, the level of modulation is determined to be QPSK 1/12, and, therefore, corresponding coding is implemented. Data coded according to the level of modulation is loaded in the transmission data frame based on the size of burst by the frame generation unit 709.

In case the transmission power for terminals is relatively high, transmission data is modulated and coded according to 16-QAM, 64-QAM, or the like which is higher than the level of modulation of QPSK 1/12, and is loaded in the transmission data frame.

As described above, according to the present invention, the power is distributed for respective terminal groups and for respective bursts according to the average downlink quality information for entire frequency bands, so that the construction of the system can be simply implemented with relation to generation of data frames.

According to an embodiment of the present invention, as in FIG. 7, the power determination unit 702 includes the power re-distribution unit 703, the first memory 704, the second memory 705, and the power allocation unit 706. The power re-distribution unit 703 calculates the allocation power $P_{n,k}(t)$ and the minimum requirement power $$P_{n,k}^{min}(t),$$

compares the power difference $$\Delta P_{n,k}(t)\ (\Delta P_{n,k}(t)=P_{n,k}(t)-P_{n,k}^{min}(t))$$

between the allocation power and the minimum requirement power with a threshold, for example, 0 and re-distributes power for respective terminals.

When the power difference $$\Delta P_{n,k}(t)$$

exceeds the threshold 0, that is $$\Delta P_{n,k}(t)$$

>0, the first memory 704 stores power differences for respective terminals in a first list as the excess power of the first terminal group. When the power difference $$\Delta P_{n,k}(t)$$

is equal to or lower than the threshold, that is $$\Delta P_{n,k}(t)$$

≦0, the second memory 704 stores power differences for respective terminals in a second list as the insufficient power of the second terminal group.

The power re-distribution unit 703 can re-distribute additional power to the second terminal group using the excess power of at least one terminal among the excess power stored in the first memory 704.

That is, the power re-distribution unit 703 extracts average insufficient power of terminals (second terminal group), which are allocation power lower than the minimum requirement power enabling the terminals to communicate with the radio access station system 700 among the terminals according to the allocation power, from the excess power of terminals(first terminal group), which are allocation power higher than the minimum requirement power enabling the terminals to communicate with the radio access station system 700 among terminals and can distributes the extracted power to the second terminal group.

The power re-distribution unit 703 can re-distribute additional power to the allocation power of the second terminal group stored in the second memory 705 using the excess power stored in the first memory 704 sequentially from the lowest excess power as illustrated in FIG. 6.

In detail, as described above with reference to FIG. 6, the power re-distribution unit 703 transfers the minimum excess power of the first terminal group to the second terminal group sequentially until the absolute value of the average insufficient power resulting from division of the sum of the insufficient power of the second terminal group by the number of the excess power of the first terminal group becomes lower than the minimum excess power of the first terminal group, and re-distributes the power for the respective terminals. As a result, the power re-distribution unit 703 distributes the excess power of the first terminal group to the second terminal group as much as the sum of insufficient power of the second terminal group.

The power re-distribution unit 703, as described above with reference to FIG. 6, repeatedly performs a step of dividing the sum of insufficient power of the second terminal group by the number of the terminals of the first terminal group to calculate the average insufficient power, and a step of transferring the minimum excess power from the first terminal group to the second terminal group when the absolute value of the average excess power is equal to or higher than the minimum excess power of the first terminal group.

Therefore, the power re-distribution unit 703 respectively adds final average insufficient power to the remaining excess power of the first terminal group, thereby calculating final excess power, when the absolute value of the average insufficient power becomes smaller than the minimum excess power of the first terminal group.

As a result, the power re-distribution unit 703 re-distributes the power more than the minimum requirement power for all respective terminals, by transferring the sum (multiplication of the absolute value of the final average insufficient power by the number of the terminals of the first terminal group) of the final average insufficient power to the second terminal group.

The power allocation unit 706 allocates transmission power to the respective terminals according to the power re-distributed by the power re-distribution unit 703. That is, the power allocation unit 706 respectively allocates the power acquired by adding the minimum requirement power to the final excess power calculated by the power re-distribution unit 703 (power resulting from addition of the remaining excess power of the first terminal group to the final average insufficient power) as the transmission power of the first terminal group, and respectively allocates the minimum requirement power as the transmission power of the second terminal group.

FIG. 8 is a graph of relation between a distance and Packet Error Rate (PER) illustrating expansion of coverage in the radio access station system according to the embodiment of the present invention.

In FIG. 8, terminals having PER which is lower than a threshold level communicate with a radio access station while maintaining a desired channel state. For example, in case the method of allocating the transmission power by re-distributing the power according to the present invention is not used, the distance dl from the radio access station is set as coverage area like 810. In case the method of allocating the transmission power according to the present invention is used, the distance d2 from the radio access station is set as coverage area like 820.

In case of 810, terminals adjacent to the radio access station maintains the overall quantity of data transmission according to a high level of modulation and coding. However, in case of 820, terminals located in the expanded area can also be provided with services without reducing the overall quantity of data transmission in comparison with the case of 810.

The embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A method for allocating a transmission power to a plurality of terminals in a radio access station system, the method comprising the steps of:
   (A-1) calculating an allocation power for the respective terminals based on downlink quality information of the respective terminals;
   (A-2) calculating a minimum requirement power for the respective terminals based on the downlink quality information; and
   (A-3) allocating the transmission power by distributing part of excess power of a first terminal group having the allocation power higher than the minimum requirement power to the second terminal group having the allocation power lower than the minimum requirement power, and the part of excess power is a sum of insufficient power of the second terminal group,
   wherein the downlink quality information is an average Signal-to-Interference-and Noise Ratio (SINR) with respect to entire frequency bands provided by the respective terminals.

2. The method of claim 1, wherein the steps (A-1) and (A-2) calculates the allocation power and the minimum requirement power by using the SNR and the transmission power for respective terminals at a time point prior to a time point at which the downlink quality information is reported.

3. The method of claim 1, wherein the step (A-3) comprises:
   (B-1) calculating an average insufficient power by dividing a sum of the in-sufficient power of the second terminal group by a number of terminals of the first terminal group;
   (B-2) transferring a minimum excess power from the first terminal group to the second terminal group when an absolute value of the average insufficient power is higher than the minimum excess power of the first terminal group;

(B-3) repeatedly performing the steps (B-1) and (B-2) until the absolute value of the average insufficient power is lower than the minimum excess power of the first terminal group;

(B-4) calculating a final excess power of the first terminal group by respectively subtracting the average insufficient power from the excess power of the first terminal group when the absolute value of the average insufficient power is lower than the minimum excess power of the first terminal group; and (B-5) respectively allocating the power acquired by adding the minimum requirement power to the final excess power as transmission power of the first terminal group, and allocating the minimum requirement power as transmission power of the second terminal group.

4. The method of claim 3, prior to the step (B-1), further comprising:
determining as the first terminal group and sequentially storing corresponding power differences as the excess power, in case the power difference between the allocation power and the minimum requirement power is higher than a threshold; and
determining as the second terminal group and sequentially storing corresponding power differences as the insufficient power, in case the power difference is lower than the threshold.

5. A method for allocating a transmission power to a plurality of terminals in a radio access station system, the method comprising the steps of:

(C-1) calculating power differences between an allocation power and a minimum requirement power of respective terminals based on downlink quality information of the respective terminals;

(C-2) sequentially storing power differences, in which the allocation power of respective terminals is higher than the minimum requirement power, as excess power of a first terminal group, and sequentially storing power differences, in which the allocation power of respective terminals is lower than the minimum requirement power, as insufficient power of a second terminal group; and (C-3) allocating power acquired by subtracting a sum of the insufficient power from the excess power, and allocating the minimum requirement power to the second terminal group, wherein the downlink quality information is an average Signal-to-Interference-and Noise Ratio (SINR) with respect to entire frequency bands provided by the respective terminals.

6. The method of claim 5, wherein the step (C-3) comprises the steps of:

(D-1) sequentially transferring the minimum excess power to the second terminal group until an absolute value of an average insufficient power is lower than the minimum excess power, when the average insufficient power is acquired by dividing the sum of insufficient power by a number of terminals of the first terminal group;

(D-2) pausing the transferring when an absolute value of the average insufficient power is lower than the minimum excess power, and calculating a final excess power by respectively or subtracting final average insufficient power from remaining power of the excess power; and (D-3) allocating the power acquired by adding the minimum requirement power and the final excess power as transmission power of the first terminal group, and allocating the minimum requirement power as transmission power of the second terminal group.

7. The method of claim 6, wherein the step (D-1) comprises the steps of:

(E-1) calculating the average insufficient power by dividing a sum of the insufficient power by the number of terminals of the first terminal group;

(E-2) removing the minimum excess power from the first terminal group when an absolute value of the average insufficient power is higher than the minimum excess power, and transferring the minimum excess power to the second terminal group; and (E-3) repeatedly performing the steps (E-1) and (E-2) until the absolute value of the average insufficient power is lower than the minimum excess power.

8. The method of claim 6, wherein the step (D-2) comprises a step of sequentially distributing the minimum excess power as much as the sum of the insufficient power.

9. The method of claim 6, prior to the step (D-1), further comprising a step of calculating the allocation power and the minimum requirement power of respective terminals based on downlink quality information of respective terminals.

10. The method of claim 5, wherein the method of allocating power is used in communication systems according to at least one of IEEE 802.16d/e, Wibro, and WiMAX.

11. A radio access station system for communicating with a plurality of terminals, comprising:
a quality information determination unit for determining downlink quality information of respective terminals; and
a power determination unit for calculating an allocation power and a minimum requirement power of the respective terminals based on the downlink quality information, and determining a transmission power of the respective terminals based on a power difference between the allocation power and the minimum requirement power,
wherein the power determination unit determines the transmission power by distributing part of excess power of a first terminal group having the power difference higher than a threshold to a second terminal group as much as insufficient power of a second terminal group having the power difference lower than the threshold, and
wherein the downlink quality information is an average Signal-to-Interference-and Noise Ratio (SINR) with respect to entire frequency bands provided by the respective terminals.

12. The radio access station system according to claim 11, wherein the power determination unit calculates the allocation power and the minimum requirement power using the SNR and the transmission power of respective terminals at the time point prior to the time point at which the downlink quality information is reported.

13. The radio access station system of claim 11, wherein the power determination unit calculates average insufficient power by dividing a sum of the insufficient power of the second terminal group by a number of terminals of the first terminal group, and calculates a final excess power of the first terminal group by respectively subtracting the average insufficient power from the excess power of the first terminal group when an absolute value of the average insufficient power is lower than the minimum excess power of the first terminal group.

14. The radio access station system of claim 13, wherein the power determination unit sequentially transfers the minimum excess power from the first terminal group to the second terminal group until an absolute value of the average insufficient power is lower than the minimum excess power of the first terminal group when the absolute value of the average insufficient power is higher than the minimum excess power of the first terminal group.

15. The radio access station system of claim 13, wherein the power determination unit respectively allocates the power acquired by adding the minimum requirement power and the final excess power as transmission power of the first terminal group, and allocates the minimum requirement power as transmission power of the second terminal group.

16. The radio access station system of claim 11, wherein the power determination unit comprises:
 first memory for storing the excess power of the first terminal group in which the power difference which is higher than the threshold;
 second memory for storing the insufficient power of the second terminal group in which the power difference which is lower than the threshold; and
 a power re-distribution unit for calculating the power differences, and re-distributing the power to the respective terminals by sequentially transferring the minimum excess power of the first terminal group to the second terminal group until an absolute value of average insufficient power acquired by dividing a sum of the insufficient power by the number of terminals of the first terminal group is lower than the minimum excess power.

17. The radio access station system of claim 16, wherein the power re-distribution unit re-distributes the power to the respective terminals by respectively subtracting the final average insufficient power from remaining power of the excess power, and transferring the sum of the final average insufficient power to the second terminal group when the absolute value of the average insufficient power becomes smaller than the minimum excess power, the sum of the final average insufficient power being multiplication of an absolute value of the final average insufficient power by the number of terminals of the first terminal group.

18. The radio access station system of claim 16, further comprising a power allocation unit for allocating the transmission power to the respective terminals according to the power re-distributed.

19. The radio access station system of claim 18, wherein the power allocation unit respectively allocates the power acquired by adding the minimum requirement power and the final excess power, which is acquired by subtracting the final average insufficient power from the remaining power of the first terminal group, as transmission power of the first terminal group, and allocates the minimum requirement power as transmission power of the second terminal group.

20. The radio access station system of claim 11, wherein the power determination unit determines the transmission power by sequentially distributing the minimum excess power as much as the sum of the insufficient power.

21. The radio access station system of claim 11, further comprising:
 a scheduler for determining a size of burst for the respective terminals according to the transmission power;
 a modulation and coding-level determinator for determining a level of modulation and coding for the respective terminals according to the transmission power, and
 a frame generation unit for generating a transmission frame for the respective terminals according to the size of burst and the level of modulation and coding.

22. A radio access station system for allocating transmission power to a plurality of terminals in order to communicate with the terminals, comprising:
 a quality information determination unit for determining an average Signal-to-Interference-and Noise Ratio (SINR) for entire frequency bands provided by the respective terminals; and
 a power re-distribution unit for calculating an average insufficient power of terminals of a second terminal group) which are allocation power lower than the minimum requirement power enabling the terminals to communicate with the radio access station system among the terminals, and calculating excess power of terminals of a first terminal group which are allocation power higher than the minimum requirement power, and sequentially distributing the minimum excess power as much as the sum of the insufficient power.

23. The radio access station system of claim 22, wherein the average insufficient power is acquired by dividing a sum of insufficient power by the number of terminals of the first terminal group.

24. The radio access station system of claim 22, further comprising a power allocation unit for allocating the power acquired by subtracting the average insufficient power from the allocation power to the first terminal group, and allocating the minimum requirement power to the second terminal group.

25. The radio access station system of claim 22, wherein the power re-distribution unit primarily distributes the excess power lower than the average insufficient power to the second terminal group, and extracts the average insufficient power from the respective excess power of the first terminal group.

26. The radio access station system of claim 22, wherein the power re-distribution unit sequentially distributes the excess power lower than the average insufficient power to the second terminal group from the minimum excess power, and extracts the average insufficient power from the respective excess power of the first terminal group.

27. The radio access station system according to claim 22, further comprising:
 a scheduler for determining a size of burst for the respective terminals according to the transmission power of the respective terminals;
 a modulation and coding-level determinator for determining a level of modulation and coding for the respective terminals according to the transmission power of the respective terminals; and
 a frame generation unit for generating a transmission frame of the respective terminals according to the size of burst and the level of modulation and coding.

* * * * *